(12) United States Patent
Spycher et al.

(10) Patent No.: US 10,180,896 B2
(45) Date of Patent: Jan. 15, 2019

(54) SYSTEM AND METHOD OF DEBUGGING MULTI-THREADED PROCESSES

(71) Applicant: Synopsys, Inc., Mountain View, CA (US)

(72) Inventors: Matthias Spycher, Santa Clara, CA (US); Dietmar Petras, Langerwehe (DE)

(73) Assignee: Synopsys, Inc., Mountain View, CA (US)

( * ) Notice: Subject to any disclaimer, the term of this patent is extended or adjusted under 35 U.S.C. 154(b) by 122 days.

(21) Appl. No.: 15/251,925

(22) Filed: Aug. 30, 2016

(65) Prior Publication Data
US 2017/0004068 A1    Jan. 5, 2017

Related U.S. Application Data

(60) Continuation of application No. 14/165,541, filed on Jan. 27, 2014, now Pat. No. 9,459,992, which is a
(Continued)

(51) Int. Cl.
*G06F 9/44* (2018.01)
*G06F 11/36* (2006.01)

(52) U.S. Cl.
CPC ...... *G06F 11/3664* (2013.01); *G06F 11/3636* (2013.01)

(58) Field of Classification Search
CPC ............... G06F 11/3636; G06F 11/362; G06F 17/5022; G06F 17/5009; G06F 11/3644;
(Continued)

(56) References Cited

U.S. PATENT DOCUMENTS

| 5,819,093 A | 10/1998 | Davidson et al. |
| 5,953,530 A | 7/1999 | Rishi et al. |

(Continued)

OTHER PUBLICATIONS

James A. Rowson; Hardware Software Co-Simulation; DAC; 2 pages; <https://www.cs.york.ac.uk/rts/docs/DAC-1964-2005/PAPERS/1994/DAC94_439.PSF> (Year: 1994).*

(Continued)

*Primary Examiner* — Geoffrey R St Leger
*Assistant Examiner* — Cuong V Luu
(74) *Attorney, Agent, or Firm* — Fenwick & West LLP

(57) ABSTRACT

A system and method of debugging a multi-threaded process with at least one running thread and at least one suspended thread is disclosed. Embodiments utilize a blocking function to block the thread of a process while other threads are allowed to run. The blocking function may be executed in a suspended thread by a debugger under control of a thread blocking controller. The other threads may implement interprocess communication channels for enabling communication between the process and another application. A simulated user interface (UI) of a debugger enables interaction with users while a hardware simulation thread is blocked, where blocking of the hardware simulation thread may be implemented by a thread blocking component implemented externally to the debugger. Where a thread blocking controller is implemented within the debugger, a debugger UI may interact with a user while the hardware simulation thread is blocked and interprocess communication threads are running.

16 Claims, 6 Drawing Sheets

Related U.S. Application Data division of application No. 12/001,238, filed on Dec. 10, 2007, now Pat. No. 8,683,444.

(60) Provisional application No. 60/874,436, filed on Dec. 11, 2006.

(58) Field of Classification Search
CPC .............. G06F 13/105; G06F 9/3009; G06F 2209/5018
See application file for complete search history.

(56) References Cited

U.S. PATENT DOCUMENTS

| | | | |
|---|---|---|---|
| 6,042,614 A | 3/2000 | Davidson et al. | |
| 6,345,242 B1* | 2/2002 | Dearth | G06F 17/5022 703/22 |
| 6,378,124 B1 | 4/2002 | Bates et al. | |
| 6,587,967 B1 | 7/2003 | Bates et al. | |
| 6,681,384 B1 | 1/2004 | Bates et al. | |
| 6,848,097 B1* | 1/2005 | Alverson | G06F 11/362 717/124 |
| 6,957,436 B1 | 10/2005 | Mihic | |
| 6,978,399 B2 | 12/2005 | Bates et al. | |
| 7,171,653 B2 | 1/2007 | Albrecht | |
| 7,426,735 B2 | 9/2008 | Bliss et al. | |
| 7,441,233 B1 | 10/2008 | Orndorff et al. | |
| 7,613,599 B2 | 11/2009 | Bade et al. | |
| 7,617,084 B1* | 11/2009 | Koslow | G06F 17/5022 703/14 |
| 7,716,031 B2 | 5/2010 | Vanspauwen et al. | |
| 7,904,886 B2 | 3/2011 | Dufour et al. | |
| 8,316,352 B2* | 11/2012 | Lev | G06F 11/362 717/124 |
| 8,683,444 B1* | 3/2014 | Spycher | G06F 11/3636 717/124 |
| 8,903,703 B2* | 12/2014 | Vanspauwen | G06F 17/5009 703/13 |
| 9,459,992 B2 | 10/2016 | Spycher et al. | |
| 9,703,905 B2* | 7/2017 | Ye | G06F 17/5022 |
| 2002/0059054 A1 | 5/2002 | Bade | |
| 2003/0192032 A1 | 10/2003 | Andrade et al. | |
| 2004/0054944 A1 | 3/2004 | Bates et al. | |
| 2004/0194067 A1 | 9/2004 | Lien et al. | |
| 2004/0250244 A1 | 12/2004 | Albrecht | |
| 2005/0034102 A1 | 2/2005 | Peck | |
| 2005/0044552 A1 | 2/2005 | Bliss et al. | |
| 2005/0071814 A1 | 3/2005 | Aguilar et al. | |
| 2006/0195821 A1* | 8/2006 | Vanspauwen | G06F 11/3664 717/124 |
| 2006/0218535 A1 | 9/2006 | Delmonte et al. | |
| 2006/0253842 A1 | 11/2006 | Pees et al. | |
| 2007/0011656 A1 | 1/2007 | Kumamoto | |
| 2007/0043698 A1 | 2/2007 | Short et al. | |
| 2007/0094642 A1 | 4/2007 | Dove et al. | |
| 2007/0168984 A1 | 7/2007 | Heishi et al. | |
| 2007/0180430 A1 | 8/2007 | Farchi et al. | |
| 2007/0234295 A1 | 10/2007 | Dufour et al. | |
| 2008/0127035 A1* | 5/2008 | Lev | G06F 11/362 717/100 |
| 2008/0263521 A1 | 10/2008 | Neumann et al. | |
| 2008/0301644 A1 | 12/2008 | Drepper | |
| 2010/0058296 A1 | 3/2010 | Nattinger | |
| 2014/0114640 A1* | 4/2014 | Ye | G06F 11/261 703/21 |

OTHER PUBLICATIONS

Jonathan Bachrach et al.; Cyclist Accelerating Hardware Development; IEEE; pp. 1011-1018; <https://dl.acm.org/citation.cfm?id=3199840> (Year: 2017).*
Somnath Banerjee et al.; Fast and Scalable Hybrid Functional Verification and Debug with Dynamically Reconfigurable Co-simulation; ACM; pp. 115-122; <https://dl.acm.org/citation.cfm?id=2429406> (Year: 2012).*
Will Sherwood; A Prototype Engineering Tester for Microcode and Hardware Debugging; IEEE; pp. 64-69; <https://dl.acm.org/citation.cfm?id=808215> (Year: 1984).*
Joshua Monson et al.; Using Source-Level Transformations to Improve High-Level Synthesis Debug and Validation on FPGAs; ACM; pp. 5-8; <https://dl.acm/org/citation.cfm?id=2689087> (Year: 2015).*
Keith Campbell et al.; Debugging and Verifying SoC Designs through Effective Cross-Layer Hardware-Software Co-simulation; ACM; 6 pages; <https://dl.acm.org/citation.cfm?id=2898002> (Year: 2016).*
Milos Prvulovic et al.; ReEnact Using Thread-Level Speculation Mechanisms to Debug Data Races in Multithreaded Codes; 2003 IEEE; 12 pages;<http://ieeexplore.ieee.org/stamp/stamp.jsp?tp=&arnumber=1206993>.
Patric Bohrer et al.; Mambo a full system simulator for the PowerPC architecture; 2004 ACM; pp. 8-12; <http://dl.acm.org/citation.cfm?id=1054910>.
Anthony-Tmg Nguyen et al.; The augmint multiprocessor simulation toolkit for Intel x86 architecture; 1996 IEEE; pp. 486-490; <http://ieeexplore.ieee.org/stamp/stamp.jsp?tp=&arnumber=563597>.
Isabel A. Nepomuceno-Chamorro; A Java Simulator for Basic Transition P Systems; 2004 Citeseer; pp. 309-315; <http://citeseerx.ist.psu.edu/viewdoc/download?doi=10.1.1.225.4187&rep-=repl&type=pdf>.
M. Adda et al.; A Simulator for a Multithreaded Processor; 1999 Citeseer; 4 pages; <http://citeseerxist.psu.edu/viewdoc/download?doi=10.1.1.28.-3202&rep=repl&type=pdf>.
Haixia Wang et al.; Acceleration Techniques for Chip-Multiprocessor Simulator Debug; 2006 Springer; pp. 509-515; <http://link.springer.com/chapter/10.1007/11859802._51>.
Ghosh, A., A Hardware-Software Co-simulator for Embedded System Design and Debugging, Mitsubishi Electr, Sep. 1995, pp. 155-164, <http://ieeexplore.ieee.org/xpls/abs_all.jsp?arnumber=486217&tag-=1>.
Klein, Russell, Miami: A Hardware Software Co-Simulation Environment, 1996 IEEE, pp. 173-177, <http://ieeexplore.ieee.org/xpls/abs_all.jsp?arnumber=506802>.
Becker, David, An Engineering Environment for Hardwarelsoftware Co-Simulation, 1992 IEEE, pp. 129-134, <http://ieeexplore.ieee.org/xpls/abs_all.jsp?arnumber=227848>.
Wang, Perry H., Helper Threads via Virtual Multithreading, 2004 IEEE, pp. 74-82, <http://ieeexplore.ieee.org/stamp/stamp.jsp?tp=&arnumber=138816- - 0>.
Prvulovic, Milos, ReEnact: Using Thread-Level Speculation Mechanisms to Debug Data Races in Multithreaded Codes, 2003 IEEE, 12 pages, <http://ieeexplore.ieee.org/stamp/stamp.jsp?tp=&arnumber=1206993>.
Talavera, G., Hardware-Software Debugging Techniques for Reconfigurable Systems-on-Chip, 2004 IEEE, pp. 1402-1407, <http://ieeexplore.ieee.org/stamp/stamp.jsp?tp=&arnumber=1490767>.
Ghosh, Sumit et al., An Asynchronous Distributed Approach for the Simulation of Behavior-Level Models on Parallel Processors, 1992 IEEE, pp. 639-652, <http://ieeexplore.ieee.org/stamp/stamp.jsp?tp=&arnumber=388044>.
Bohrer, Patrick, Mambo a full system simulator for the PowerPC Architecture, 2004 ACM, pp. 8-12, <http://dl.acm.org/citation.cfm?id=1054910>.
Nguyen, Anthony-Tmg et al., The augmint multiprocessor simulation toolkiet for Intel x86 architectures, 1996 IEEE, pp. 486-490, <http://ieeexplore.ieee.org/stamp/stamp.jsp?tp=&arnumber=563597>.
Yoo, Sungjoo et al., Optimistic Distributed Timed Cosimulation Based on Thread Simulation Model, 1998 IEEE, pp. 71-75, <http://ieeexplore.ieee.org/stamp/stamp.jsp?tp=&arnumber=666240>.
Raghavan, Ram et al., Multiprocessor System Verification Through Behevioral Modeling and Simulation, 1995 IEEE, pp. 395-402, <http://ieeexplore.ieee.org/stamp/stamp.jsp?tp=&arnumber=472462>.

(56) References Cited

OTHER PUBLICATIONS

Zilic, Zeljko et al, Adding Debug Enhancements to Assertion Checkers for Hardware Emulation and Silicon Debug, 2006 IEEE, 6 pages, <http://ieeexplore.ieee.org/stamp/stamp.jsp?tp=&arnumber=4380831>.

Parson, D. et al., "A Framework for Simulating Heterogeneous Virtual Processors," Proceedings of the 32nd Annual Simulation Symposium, 1999, pp. 58-67. May be retrieved at URL:< http://www.ieee.org/portal/innovate/search/article_details.html--?article=7664155>.

United States Ex Parte Quayle Action, U.S. Appl. No. 12/001,238, May 3, 2008, 6 pages.

United States Office Action, U.S. Appl. No. 12/001,238, dated Oct. 9, 2012, 19 pages.

United States Office Action, U.S. Appl. No. 12/001,238, dated Jun. 11, 2012, 18 pages.

United States Office Action, U.S. Appl. No. 12/001,238, dated Jan. 9, 2012, 19 pages.

United States Office Action, U.S. Appl. No. 12/001,238, dated Aug. 12, 2011, 18 pages.

United States Office Action, U.S. Appl. No. 14/165,541, dated Mar. 17, 2016, 18 pages.

United States Office Action, U.S. Appl. No. 14/165,541, dated Nov. 12, 2015, 16 pages.

United States Office Action, U.S. Appl. No. 14/165,541, dated Aug. 19, 2015, 14 pages.

\* cited by examiner

SYSTEM AND METHOD OF DEBUGGING MULTI-THREADED PROCESSES

CROSS-REFERENCE TO RELATED APPLICATIONS

The present application is a continuation of U.S. patent application Ser. No. 14/165,541 filed on Jan. 17, 2014, now U.S. Pat. No. 9,459,992, which is a divisional of U.S. patent application Ser. No. 12/001,238 filed on Dec. 10, 2007, now U.S. Pat. No. 8,683,444, which claims the benefit of U.S. Provisional Patent Application No. 60/874,436, filed on Dec. 11, 2006." All of these applications are incorporated herein by reference in their entirety and for all purposes.

BACKGROUND OF THE INVENTION

Debugging of multi-threaded hardware simulation processes is generally carried out by suspending all threads of the hardware simulation process before beginning debugging operations. Most debuggers rely upon the operating system to assist in debugging the hardware simulation process, and most operating systems (e.g., Windows, Linux, etc.) require the suspension of all threads. Once all the threads of the multi-threaded hardware simulation process are suspended, a user may step through or otherwise examine simulation results from the simulation of the hardware model to locate and fix bugs in the hardware model.

Since conventional debugging systems debug multi-threaded hardware simulation processes when all threads are suspended, they provide users limited debugging functionality for multi-threaded hardware simulation processes which rely upon the suspended threads to communicate with other applications (i.e., using interprocess communication). For example, where the state of the simulated platform model depends upon information in another application, the conventional debugger may return an incomplete or incorrect picture of the simulated hardware state for debugging purposes.

Additionally, the ability of conventional debugging systems to debug embedded software (e.g., applications run on the simulated hardware component) is also limited when all threads of the hardware simulator are suspended. Debugging of embedded software generally requires an embedded software debugger to access the state of the underlying simulated platform. Accordingly, by suspending interprocess communication threads of the hardware simulation, the interprocess communication channels used by the embedded software debugger to access the state of the simulated platform are severed. As such, conventional debugging systems provide embedded software debuggers with limited access to the state of the simulated platform, thereby resulting in incomplete and potentially inaccurate information for debugging of the embedded software.

SUMMARY OF THE INVENTION

Accordingly, a need exists for a debugging system which enables the running of one or more threads of a process while another thread of the process is blocked. More specifically, a need exists for a debugging system which blocks a hardware simulation thread while allowing interprocess communication threads to run. Further, a need exists for a debugging system which provides a simulation process access to applications coupled via interprocess communication channels. A need also exists for a debugging system which provides embedded software debuggers access to the simulated platform state to enable debugging of embedded software. Embodiments of the present invention provide novel solutions to these needs and others as described below.

Embodiments are directed to a system and method of debugging a multi-threaded process with at least one running thread and at least one suspended thread. More specifically, embodiments utilize a function call on the thread to be suspended for implementing a blocking function (e.g., executing a loop with a guard variable and a sleep function, blocking on a thread control element such as a semaphore, condition variable, mutex, etc.) to block the thread (e.g., a hardware simulation thread) of a process (e.g., a simulator for simulating a hardware component or platform) while other threads are allowed to run. The blocking function may be executed in a suspended thread by a debugger under control of a thread blocking controller in one embodiment. Where the other threads comprise interprocess communication threads (e.g., to enable communication with other processes or applications such as embedded software debugger applications, graphical user interfaces or visualization applications, performance measurement applications, etc.), embodiments enable communication over interprocess communication channels implemented by the interprocess communication threads. Accordingly, embodiments enable debuggers (e.g., hardware debuggers, embedded software debuggers, etc.) and other components (e.g., applications coupled to the simulator via interprocess communication channels, etc.) to access the simulated platform state or otherwise communicate via the interprocess communication channels, thereby improving the debugging of software (e.g., embedded software, etc) and simulated hardware components (e.g., a simulated hardware platform, etc.).

Embodiments also provide a simulated user interface (UI) of a debugger for enabling interaction with users while a hardware simulation thread is blocked, where the blocking of the hardware simulation thread may be implemented by a thread blocking component implemented externally to the debugger. Once a user debug command is detected, all threads of the simulator may be suspended (e.g., using an unblock function which aborts the blocking of the blocking function such that the blocking function returns) to enable execution of the user debug command accessed from the simulated debugger UI. In one embodiment, user inputs to the simulated debugger UI may be forwarded to the debugger while all threads of the simulator are suspended. The hardware simulation thread may thereafter be blocked (e.g., using a blocking function) while at least one interprocess communication thread is allowed to operate. In one embodiment, the blocking of the hardware simulation thread may occur automatically after a predetermined period of time without detection of a user debug command (e.g., input via the simulated debugger UI).

In one embodiment where a thread blocking controller is implemented within the debugger, a UI of the debugger may interact with a user while the hardware simulation thread is blocked and interprocess communication threads are running. Once a user debug command is detected, all threads of the simulator may be suspended (e.g., using an unblock function which aborts the blocking of the blocking function such that the blocking function returns) to enable execution of the user debug command accessed from the simulated debugger UI. The debugger UI may continue to process user inputs while all threads of the simulator are suspended. The hardware simulation thread may thereafter be blocked while at least one interprocess communication thread is allowed to operate (e.g., to enable communication with other processes or applications such as embedded software debugger applications, graphical user interfaces or visualization applications, performance measurement applications, etc.). In one embodiment, the blocking of the hardware simulation thread may occur automatically after a predetermined period of time without detection of a user debug command (e.g., input to the debugger UI).

In one embodiment, a method of debugging a system includes, responsive to a breakpoint event, using a debugger tool to block a first thread of a multi-threaded hardware simulator of a hardware platform, wherein the multi-threaded hardware simulator includes a plurality of threads including the first thread for simulating the hardware platform and a plurality of second threads for implementing interprocess communications between the hardware simulator and other applications within the system. While the first thread is blocked, a user interface mechanism is implemented, external to the debugger tool, for receiving a user debug command. The method also includes, responsive to the user debug command, performing the following: suspending all threads of the multi-threaded hardware simulator; executing the user debug command on the debugger tool; after execution of the user debug command, blocking again the first thread; and repeating the implementing the user interface mechanism for receiving a user debug command. The other applications may be selected from a group consisting of: a visualization application; a performance measurement application; and an embedded software debugger application. An inferior call on the first thread may be issued causing a blocking function to be executed to block the first thread. The blocking function may be selected from a group consisting of: executing a loop with a guard variable; and blocking on a thread control element. The thread control element may be selected from a group consisting of: a semaphore; a wait condition; a conditional variable; and a mutex.

In another embodiment, a method of debugging a system includes, in response to a detected event, blocking a first thread of a simulator using a debugger communicatively coupled to the simulator, the simulator further including a second thread for implementing an interprocess communication channel between the simulator and an additional process. The second thread is allowed to operate while the first thread is blocked. The method also includes communicating using the interprocess communication channel while the first thread is blocked. The first thread is suspended. The blocking the first thread may include executing a blocking function in the first thread, and wherein the suspending the first thread may include executing an unblock function to abort the blocking function. The blocking function may be selected from a group consisting of a sleep function, a semaphore, a wait condition, a conditional variable, and a mutex.

In yet another embodiment, a system includes a multi-threaded simulator including a first thread and a second thread, the second thread for implementing an interprocess communication channel between the simulator and an additional process. A debugger is communicatively coupled to the multi-threaded simulator, the debugger for blocking the first thread in response to a detected event, the debugger further for allowing the second thread to operate while the first thread is blocked, the debugger further for suspending all threads of said multi-threaded simulator. A controller is communicatively coupled to the debugger and for initiating the blocking and the suspending performed by the debugger. The additional process may be a process of the system. The simulator may include a hardware simulator, and wherein the first thread includes a hardware simulation thread. The debugger may be operable to execute a blocking function in the first thread to implement the blocking, and wherein the debugger may further be operable to implement the suspending by executing an unblock function to abort the blocking function. The blocking function may be selected from a group consisting of a sleep function, a semaphore, a wait condition, a conditional variable, and a mutex.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
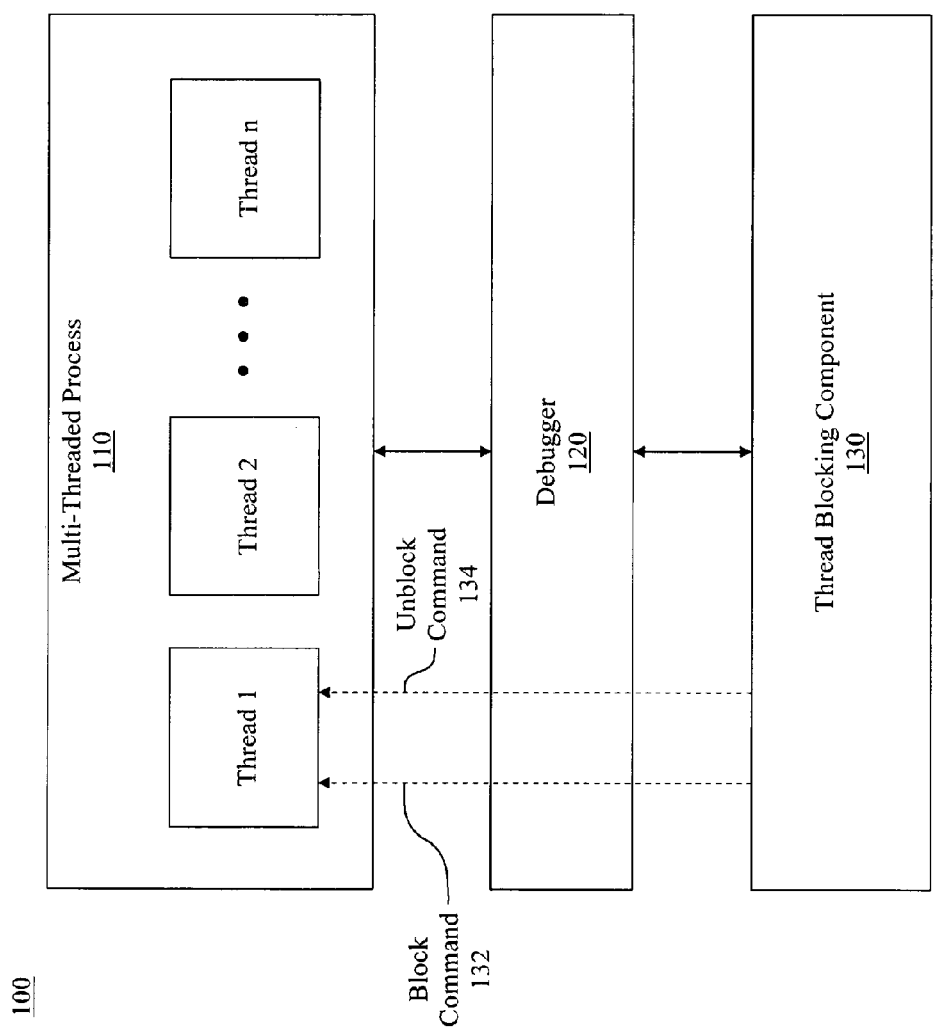
FIG. 1 shows an exemplary debugging system for debugging a multi-threaded process with at least one active thread and a suspended thread in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "creating," "debugging," "defining," "depicting," "detecting," "determining," "displaying," "establishing," "executing," "flipping," "generating," "grouping," "hiding," "identifying," "initiating," "interacting," "modifying," "monitoring," "moving," "outputting," "performing," "placing," "presenting," "processing," "programming," "querying," "removing," "repeating," "resuming," "sampling," "simulating," "sorting," "storing," "subtracting," "suspending," "tracking," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

FIG. 1 shows exemplary debugging system 100 for debugging a multi-threaded process with at least one active thread and a blocked thread in accordance with one embodiment of the present invention. As shown in FIG. 1, multi-threaded process 110 comprises multiple threads (e.g., Thread 1 through Thread n), where Thread 1 is blocked by debugger 120 while Thread 2 through Thread n are allowed to run. As such, debugger 120 may debug multi-threaded process 110 while Thread 1 is blocked and Thread 2 through Thread n are running, thereby extending the capabilities of debugger 120 (e.g., by enabling debugger 120 to access additional information using one or more active threads, to perform additional functions implemented by the active threads, etc.). Additionally, the presence of active threads in multi-threaded process 110 may enable other systems or devices (e.g., an embedded software debugger operable to debug embedded software running on top of multi-threaded process 110, etc.) to access the state of multi-threaded process 110 while thread 1 is blocked.

Multi-threaded process 110 may comprise any piece of software code comprising instructions which can be run on a computer system. Multi-threaded process 110 may comprise an application or program for performing one or more functions. In one embodiment, multi-threaded process 110 may implement a hardware simulator capable of simulating a hardware and/or software platform. Additionally, in one embodiment, multi-threaded process 100 may conform to the SystemC standard.

In one embodiment, Thread 1 may comprise an operating system (OS) thread which is provided by or with the support of the OS (e.g., the kernel of the OS, other portions of the OS, etc.). OS threads may be distinguished from light-weight threads or quick threads which are implemented without support of the OS. Additionally, in one embodiment, Thread 1 may comprise an OS thread which comprises multiple sub-threads, where one or more of the sub-threads are implemented by at least one light-weight thread. Further, where multi-threaded process 110 implements a SystemC simulator for performing SystemC simulations, multi-threaded process 110 may comprise multiple SystemC threads (e.g., which may be implemented by way of light-weight threads) which may be executed within an OS thread (e.g., Thread 1) in one embodiment.

Debugger 120 may comprise any debugger capable of accessing multi-threaded process 110 (e.g., results from execution of multi-threaded process, etc.). Debugger 120 may enable the location and/or correction of bugs within multi-threaded process 110. Additionally, debugger 120 may comprise a hardware debugger and/or system-level debugger in one embodiment.

Blocking of Thread 1 may be controlled by thread blocking component 130 using block command 132. Block command 132 may effectively block Thread 1, thereby reducing functionality implemented by Thread 1 and/or reducing access to Thread 1 (e.g., by other components of system 100, other systems, etc.). Block command 132 may be implemented by controlling debugger 120 (e.g., using thread blocking component 130) to call a blocking function (e.g., by issuing an "inferior call") for execution in Thread 1 in one embodiment. The blocking function may comprise a loop with a guard variable, a thread control element operable to block a thread (e.g., a semaphore, wait condition, condition variable, mutex, etc.), etc. In one embodiment, calling the blocking function in the thread to be suspended may simultaneously block Thread 1 while activating or otherwise making operational one or more of Thread 2 through Thread n. The blocking of Thread 1 and/or activation of at least one of Thread 2 through Thread n may be performed after a suspension of all threads of multi-threaded process 110 (e.g., in response to encountering a breakpoint or other event associated with multi-threaded process 110, debugger 120, etc.) in one embodiment.

Thread blocking component 130 may also suspend threads of multi-threaded process 110 (e.g., Thread 1, Thread 2, Thread n, etc.) using unblock command 134. Unblock command 134 may abort the blocking of the blocking function (e.g., implemented using blocking command 132) such that the blocking function returns. In this manner, all threads of multi-threaded process 110 may be suspended, in one embodiment, such that debug commands may be executed by debugger 120. Unblock command 134 may be implemented by controlling debugger 120 (e.g., using thread blocking component 130) to call an unblock function for execution in a thread of system 100 (e.g., Thread 1, Thread 2, Thread n, etc.) in one embodiment. Additionally, a TCP socket may be used as an IPC channel for aborting the blocking function in one embodiment.

In one embodiment, block command 132 and unblock command 134 may be implemented by performing a loop with a guard variable "Blocker" and sleep function in accordance with the following exemplary code:

```
volatile bool Blocker;
void blockFunction( ) {
    const int duration_ms = 50;
    Blocker = true;
    while (Blocker == true) {
        Sleep(duration_ms);
```

```
        }
    }
    void breakFunction( ) {
        Blocker = false;
    }
```

As such, the function "blockFunction( )" implements block command 132 and the function "breakFunction( )" implements unblock command 134.

In another embodiment, block command 132 and unblock command 134 may be performed by a mutex and a condition variable (or wait condition) in accordance with the following exemplary code:

```
volatile bool Blocker;
ConditionVariable BlockCondition;
Mutex BlockMutex;
void blockFunction( ) {
    BlockMutex.lock( );
    Blocker = true;
    while (Blocker == true) {
        BlockCondition.wait(BlockMutex);
    }
    BlockMutex.unlock( );
}
void breakFunction( ) {
    BlockMutex.lock( );
    Blocker = false;
    BlockCondition.signal( );
    BlockMutex.unlock( );
}
```

It should be appreciated that more than one thread of multi-threaded process 110 may be blocked in one embodiment. Additionally, it should be appreciated that multi-threaded process 110 may comprise any number of active or running threads which operate while at least one thread of multi-threaded process 110 is blocked. Further, it should be appreciated that thread blocking component 130 (or one or more components of thread blocking component 130) may be alternatively implemented (e.g., within debugger 120, within a system external to system 100, etc.) in other embodiments.

Figure 2:
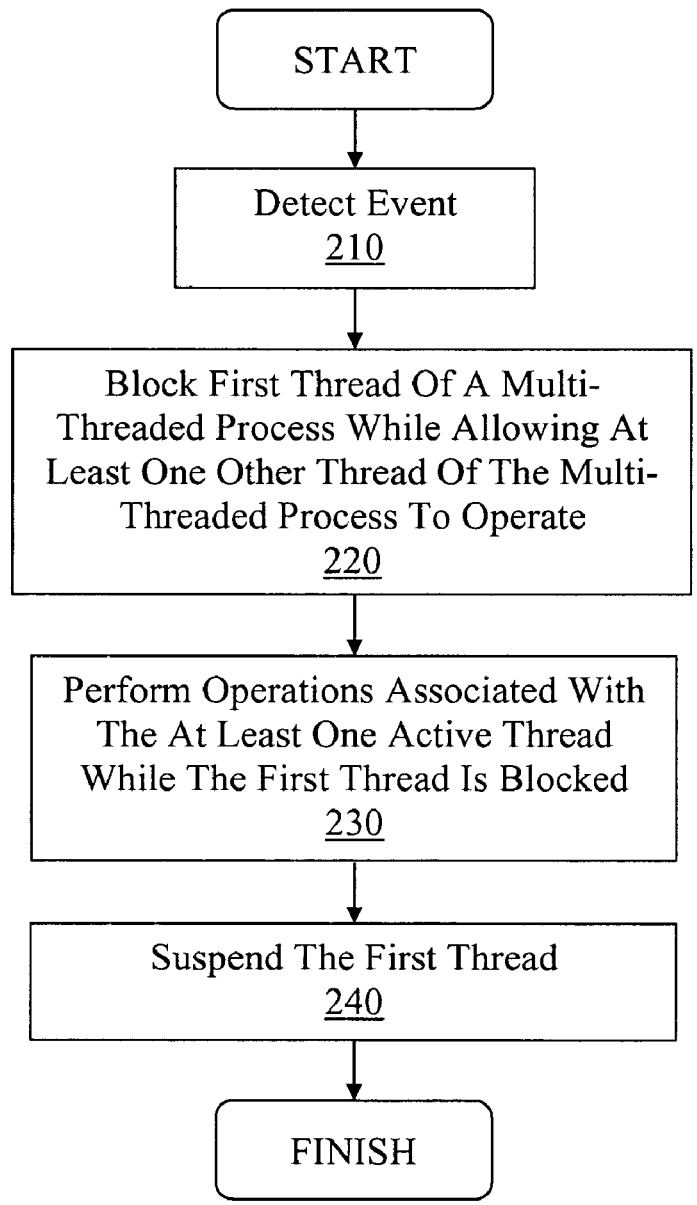
FIG. 2 shows an exemplary process for debugging a system in accordance with one embodiment of the present invention.

FIG. 2 shows exemplary process 200 for debugging a system in accordance with one embodiment of the present invention. As shown in FIG. 2, step 210 involves detecting an event. The detected event may comprise a breakpoint associated with a multi-threaded process (e.g., 110). The detected event may cause control to be transferred to a debugger (e.g., 120), which is communicatively coupled to the multi-threaded process (e.g., 110), such that the debugger may examine the state of the multi-threaded process and/or perform debugging operations on the multi-threaded process in one embodiment. Additionally, in one embodiment, all threads of the multi-threaded process (e.g., 110) may be suspended in response to the event detected in step 210.

Step 220 involves blocking a first thread (e.g., Thread 1 depicted in FIG. 1) of a multi-threaded process (e.g., 110) while allowing at least one other thread (e.g., Thread 2, Thread n, etc. depicted in FIG. 1) of the multi-threaded process to operate. The thread may be blocked using a block command (e.g., 132) as discussed above with respect to FIG. 1 in one embodiment.

As shown in FIG. 2, step 230 involves performing operations associated with at least one active thread while the first thread is blocked. For example, where the at least one active thread is operable to implement an interprocess communication (IPC) channel (e.g., to enable communication between the multi-threaded process and another system, to enable communication between the multi-threaded process and an application within system 100, etc.), communications may be transmitted and received in accordance with instructions executed by the at least one active thread. In one embodiment, the IPC channels may enable communication with or otherwise provide access to embedded software, embedded software debuggers, etc. Alternatively, other operations may be performed by execution of operations within the at least one active thread while the first thread is blocked.

Step 240 involves suspending the first thread. The first thread may be suspended using an unblock command (e.g., 134) as discussed above with respect to FIG. 1 in one embodiment. Step 240 may be performed in response to a completion of operations performed in step 230 in one embodiment. Alternatively, step 240 may be performed in response to detection of a debug command (e.g., a user debug command, machine-generated debug command, etc.), thereby enabling a debugger (e.g., 120) to execute the debug command while the first thread is suspended. Accordingly, in one embodiment, step 240 may also involve load balancing between the time in which a debugger (e.g., 120) is blocking the first thread and the time in which the debugger is executing a command (e.g., a user debug command, machine-generated debug command, etc.). In this fashion, neither of the two periods is allowed to get crowded out. And in another embodiment, step 240 may be performed automatically after a predetermined time period without detection of user interaction or input of additional debug commands. And in another embodiment, all threads of the multi-threaded process (e.g., 110) may be suspended in step 240.

Figure 3:
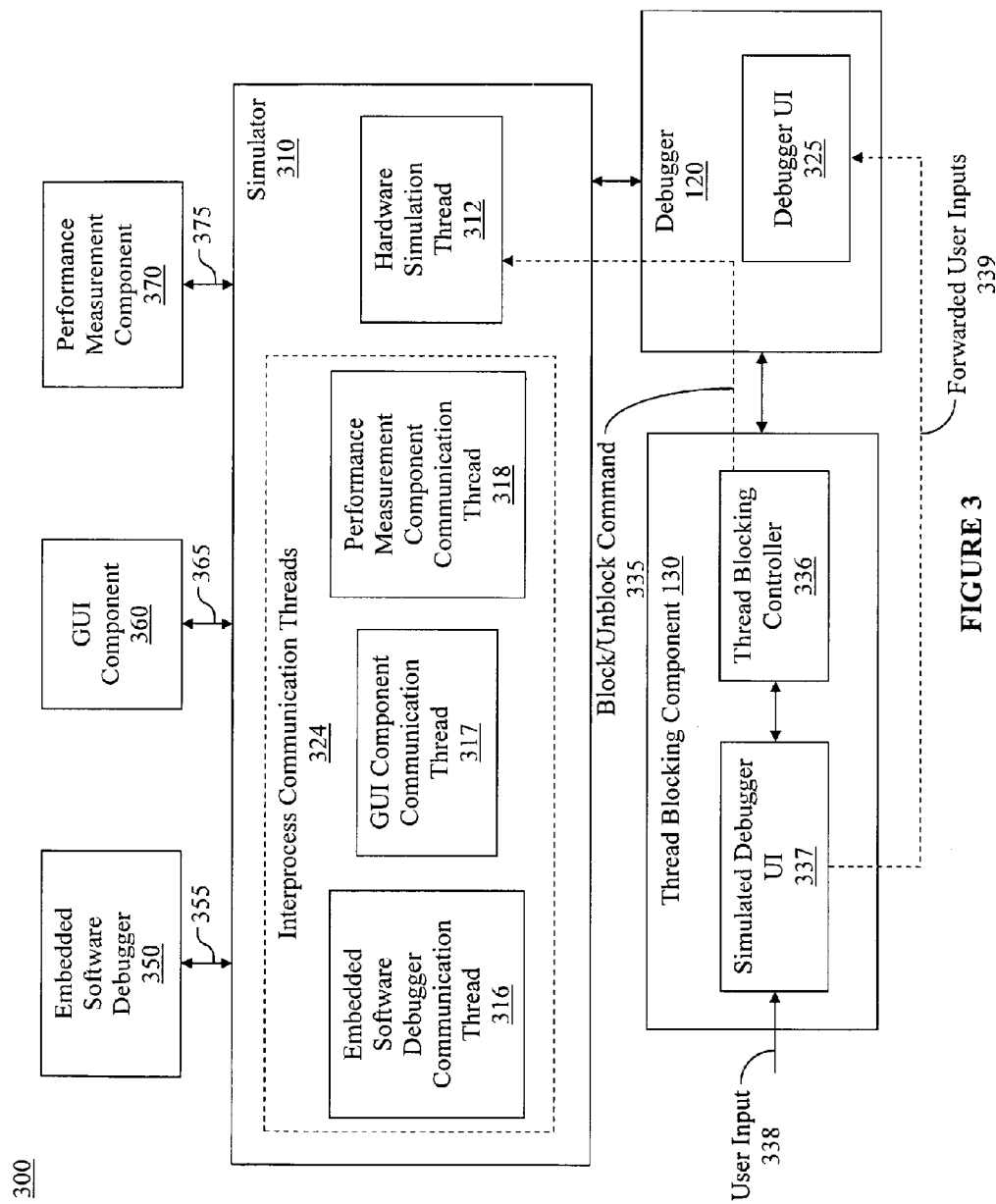
FIG. 3 shows an exemplary debugging system for implementing interprocess communication while a hardware simulation thread is blocked in accordance with one embodiment of the present invention.

FIG. 3 shows exemplary debugging system 300 for implementing interprocess communication while a hardware simulation thread is blocked in accordance with one embodiment of the present invention. As shown in FIG. 3, simulator 310 may represent one embodiment of multi-threaded process 110 of FIG. 1. Simulator 310 comprises hardware simulation thread 312 for implementing a simulation of a component model (e.g., a processor, microprocessor, etc.), where the component model may also be referred to as a platform (e.g., hardware platform, hardware/software platform, etc.), virtual platform, etc. Simulator 310 also comprises IPC threads 324 such as embedded software debugger communication thread 316 (e.g., for implementing IPC channel 355 between embedded software debugger 350 and simulator 310), graphical user interface (GUI) component communication thread 317 (e.g., for implementing IPC channel 365 between GUI component 360 and simulator 310), and performance measurement component communication thread 318 (e.g., for implementing IPC channel 375 between performance measurement component 370 and simulator 310). As such, the components or applications (e.g., 350-370) and simulator 310 may communicate using their respective IPC channels (e.g., 355-375) implemented by respective active IPC threads (e.g., 316-318) while hardware simulation thread 312 is suspended. Additionally, IPC channels 355-375 may provide debugger or other components of system 300 access to applications coupled to simulator 310 (e.g., embedded software debugger 350, GUI component 360, performance measurement component 370, etc.).

In one embodiment, simulator 310 may comprises a SystemC simulator for performing SystemC simulations.

Hardware simulation thread 312 may comprise an OS thread which comprises multiple SystemC threads. One or more of the SystemC threads may be implemented using at least one light-weight thread (or quick thread) in one embodiment.

As shown in FIG. 3, thread blocking component 130 comprises thread blocking controller 336 for controlling the blocking and suspending of hardware simulation thread 312. Thread blocking controller 336 may utilize debugger 120 to initiate execution of block/unblock commands 335 (e.g., block command 132 and unblock command 134 as discussed above with respect to FIG. 1 above) in hardware simulation thread 312, thereby enabling thread blocking controller 336 to control blocking and suspending of hardware simulation thread 336. Additionally, when blocking hardware simulation thread 312, a TCP socket may be used as an IPC channel for aborting a blocking function used to implement block command (e.g., 132) in one embodiment.

Thread blocking component 130 may also comprise simulated debugger user interface (UI) 337 for simulating debugger UI 325 of debugger 120. Debugger UI 325 and/or simulated debugger UI 337 may comprise a GUI, command-line user interface, or the like. While hardware simulation thread 312 is blocked, simulated debugger UI 337 may interact with users and accept user input 338. In one embodiment, debugger UI 325 may be unable to interact with a user and/or accept user inputs while hardware simulation thread is blocked (e.g., since the backend of debugger 120 may only support one operation at a time and is currently busy implementing the blocking function), and thus, simulated debugger UI 337 may enable system 300 to interact with users and/or accept user inputs in this situation. Additionally, simulated debugger UI 337 may function similarly to debugger UI 325 (e.g., such that a user may be unaware that he or she is interacting with a simulated UI as opposed to debugger UI 325) in one embodiment.

Where user input 338 comprises a user debug command for execution on debugger 120, simulated debugger UI 337 may notify thread blocking controller 336 that a user debug command has been received. Thread blocking controller may then issue an unblock command (e.g., 134, 335, etc.) to suspend one or more threads of simulator 310 in order to process the user debug command. In one embodiment, the suspension of the one or more threads of simulator 310 may be delayed (e.g., if a predetermined time period has not elapsed since the last suspension of hardware simulation thread 312). Once the one or more threads are suspended, debugger 120 may execute the user debug command, which may comprise accessing the state (e.g., stored in registers associated with simulator 310 and/or hardware simulation thread 312, etc.) of simulator 310, locating bugs associated with the simulated component, fixing located bugs, etc. While the one or more threads are suspended, user inputs 338 may be forwarded (e.g., represented by forwarded user inputs 339) from simulated debugger UI 337 to debugger UI 325 for processing by debugger 120. While the one or more threads are suspended, interprocess communication via IPC channels 355-375 may be suspended in one embodiment. Thereafter, hardware simulation thread 312 may be blocked (e.g., by debugger 120 under control of thread blocking controller 336), where, in one embodiment, blocking of hardware simulation thread 312 may resume or enable IPC communication via IPC channels 355-375.

Thread blocking controller 336, in conjunction with simulated debugger UI 337 and debugger 120, may automatically block and/or suspend threads of simulator 310 based upon one or more conditions or events in one embodiment. For example, debugger 120 may notify simulated debugger UI 337 when IPC communications or other operations associated with active threads (e.g., IPC threads 324) are completed, and therefore enable thread blocking controller 336 to automatically suspend all threads of simulator 310 (e.g., to prepare for execution of debug operations by debugger 120). Alternatively, threads of simulator 310 may be automatically suspended in response to detection of a debug command (e.g., a user debug command, machine-generated debug command, etc.) by simulated debugger UI 337 and/or thread blocking component 130, thereby enabling debugger 120 to execute the debug command while threads of simulator 310 are suspended. And in another embodiment, thread blocking controller 336 and/or simulated debugger UI 337 may monitor the time since the last user input and/or user debug command (e.g., input to simulated debugger UI 337), thereby enabling thread blocking controller 336 to automatically suspend threads of simulator 310 after a predetermined time period without detection of user interaction or input of additional debug commands.

In one embodiment, simulated debugger UI 337 may receive machine-input debug commands (not depicted in FIG. 3) in addition to or in place of user debug commands. The machine-input debug commands may be accessed from another system or device (e.g., external to system 300) and/or from a component of system 300. It should be appreciated that system 300 may process machine-input debug commands (e.g., by appropriately blocking hardware simulation thread 312 and appropriately suspending threads of simulator 310 to enable debugger to execute the machine-input debug commands) which are fed to system 300 at a relatively high rate (e.g., 1000 inputs per second or higher) in one embodiment. Accordingly, components of system 300 (e.g., thread blocking controller 336, simulated debugger UI 337, debugger 120, etc.) may implement load balancing between the time in which debugger 120 is blocking hardware simulation thread 312 and the time in which debugger 120 is executing a command (e.g., a user debug command, machine-generated debug command, etc.) so that neither of these two periods is allowed to get crowded out.

As shown in FIG. 3, embedded software debugger 350 may comprise a source-level debugger for debugging embedded software (e.g., operable to run on the hardware component being simulated by simulator 310), where the embedded software may comprise GUI component 360 and performance measurement component 370 in one embodiment. GUI component 360 may comprise a visualization application for implementing a GUI on a device or system using the simulated hardware component. Performance measurement component 370 may comprise an application for measuring the performance of one or more components of the device or system using the simulated hardware component. Accordingly, implementing IPC channels 355-375 (e.g., through activation of IPC threads 324) may enable embedded software debugger 350 to access and examine the state (e.g., stored within registers associated with simulator 310 and/or hardware simulation thread 312) of the underlying simulation performed by simulator 310 (e.g., by executing hardware simulation thread 312), and therefore, implement debugging of embedded software (e.g., GUI component 360, performance measurement 370, etc.) communicatively coupled to simulator 310.

Additionally, thread blocking component 130 may be implemented using multiple threads (e.g., one or more threads to implement thread blocking controller 336, and one or more other threads to implement simulated debugger UI 337). Alternatively, thread blocking controller 336 and simulated debugger UI 337 may be implemented by the same thread which implements a state machine. Accordingly, operation of each component (e.g., thread blocking controller 336 and simulated debugger UI 337) may be controlled by the state machine in one embodiment.

Although FIG. 3 shows only three applications (e.g., embedded software debugger 350, GUI component 360, performance measurement component 370, etc.) coupled to simulator 310 via IPC channels (e.g., 355-375), it should be appreciated that a larger or smaller number of applications may be coupled to simulator 310 in other embodiments. Additionally, although FIG. 3 depicts only four threads within simulator 310, it should be appreciated that simulator 310 may comprise a larger or smaller number of threads in other embodiments. It should also be appreciated that simulator 310 may comprise a larger or smaller number of blocked, suspended and/or active threads in other embodiments. For example, thread blocking controller 336 may control blocking, suspension and/or activation of any number of threads within simulator 310 in one embodiment. Further, it should be appreciated that thread blocking component 130 may comprise a different number of components in other embodiments.

Figure 4:
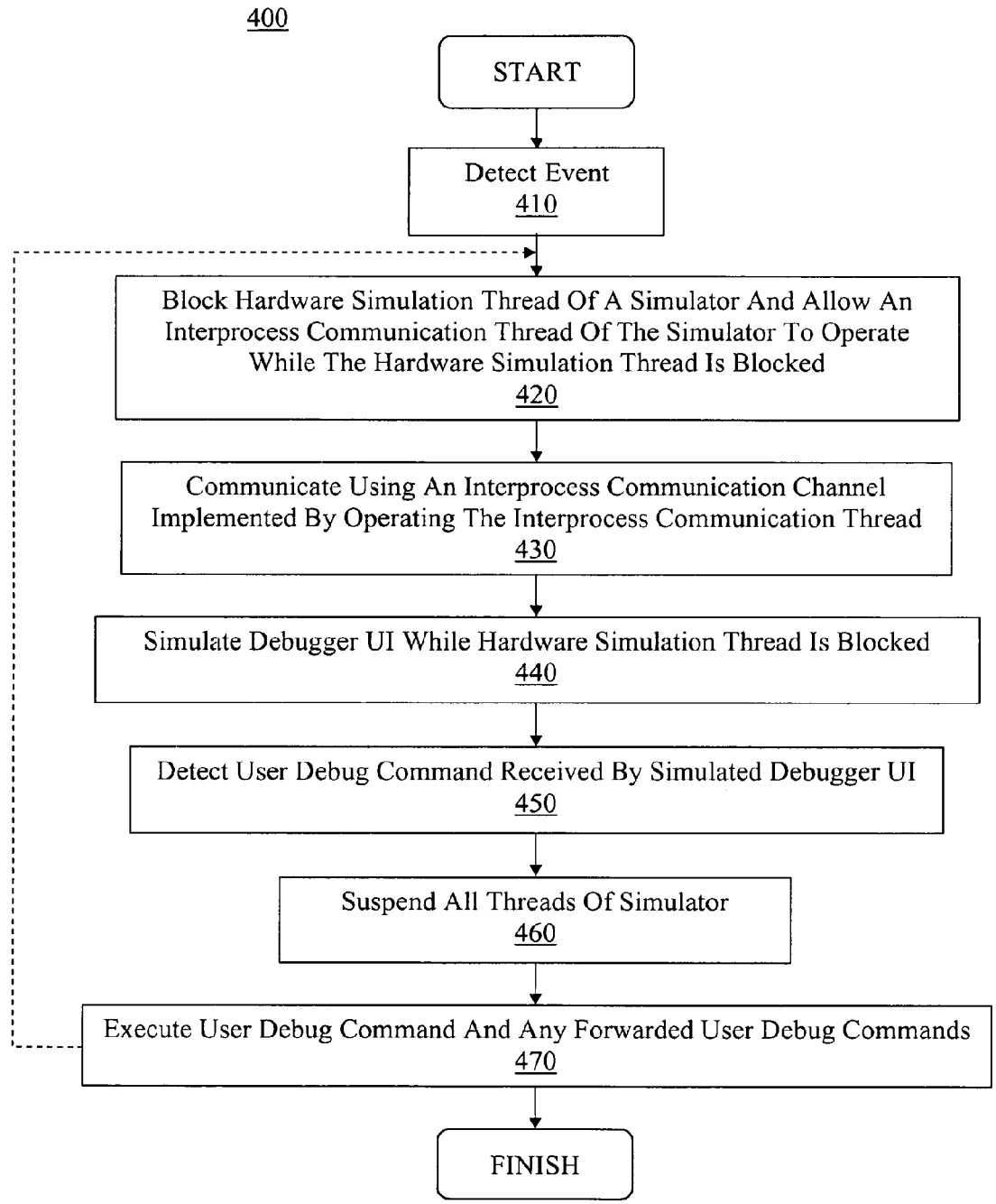
FIG. 4 shows an exemplary process for debugging a simulated component in accordance with one embodiment of the present invention.

FIG. 4 shows exemplary process 400 for debugging a simulated component in accordance with one embodiment of the present invention. As shown in FIG. 4, step 410 involves detecting an event. The detected event may comprise a breakpoint associated with a multi-threaded simulator (e.g., 310). The detected event may cause control to be transferred to a debugger (e.g., 120), which is communicatively coupled to the multi-threaded simulator (e.g., 310), such that the debugger may examine the state of the simulation and/or perform debugging operations on the multi-threaded simulator in one embodiment. Additionally, in one embodiment, all threads of the simulator (e.g., 310) may be suspended in response to the event detected in step 410.

Step 420 involves blocking a hardware simulation thread (e.g., 312) of the simulator (e.g., 310) and allowing an IPC thread (e.g., 316, 317, 318, etc.) to operate while the hardware simulation thread is blocked. The thread may be blocked using a block command (e.g., 132) as discussed above with respect to FIG. 1 in one embodiment. The block command may be initiated by a thread blocking controller (e.g., 336) of a thread blocking component (e.g., 130), where the thread blocking controller is operable to control a coupled debugger (e.g., 120) to execute a blocking function in the hardware simulation thread (e.g., 312) in one embodiment.

As shown in FIG. 4, step 430 involves communicating using an IPC channel (e.g., 355, 365, 375, etc.) implemented by the operating IPC thread (e.g., 316, 317, 318, etc.). For example, a debugger (e.g., 120) for debugging a simulated hardware component running on the simulator (e.g., 310) may access an application (e.g., embedded software debugger 350, GUI component 360, performance measurement component 370, etc.) coupled to the simulator (e.g., 310). Alternatively, an application (e.g., embedded software debugger 350, etc.) coupled to the simulator may access a state of the simulation (e.g., performed by simulator 310) and/or one or more other applications (e.g., GUI component 360, performance measurement component 370, etc.) communicatively coupled to the simulator (e.g., 310).

Step 440 involves simulating a debugger UI while the hardware simulation thread is blocked. The simulated debugger UI (e.g., 337) may simulate a debugger UI (e.g., 325) of the debugger (e.g., 120) executing the blocking of the hardware simulation thread (e.g., 312). The simulated debugger UI (e.g., 337) may be implemented externally to the simulator (e.g., 310). Additionally, the simulated debugger UI (e.g., 337) may be operable to receive inputs from a user (e.g., user interactions with the simulated UI, user debug commands, etc.) and/or from a system/device (e.g., a machine-input debugger command, etc.).

As shown in FIG. 4, step 450 involves detecting a user debug command received by the simulated debugger UI (e.g., 337). The user debug command may be detected by the simulated debugger UI (e.g., 337) itself and/or a thread blocking controller (e.g., 336) coupled to the simulated debugger UI (e.g., 337).

Step 460 involves suspending all threads of the simulator (e.g., 310). The threads of the simulator (e.g., 310) may be suspended using an unblock command (e.g., 134) as discussed above with respect to FIG. 1 in one embodiment. Step 460 may be performed in response to a completion of IPC communications performed in step 430 in one embodiment. Alternatively, step 460 may be performed in response to detection of a debug command (e.g., a user debug command, machine-generated debug command, etc.) performed in step 450, thereby enabling a debugger (e.g., 120) to execute the debug command while threads of the simulator (e.g., 310) are suspended. Accordingly, in one embodiment, step 460 may also involve load balancing between the time in which a debugger (e.g., 120) is blocking the hardware simulation thread (e.g., 312) and the time in which the debugger is executing a command (e.g., a user debug command, machine-generated debug command, etc.). And in another embodiment, step 460 may be performed automatically after a predetermined time period without detection of user interaction or input of additional debug commands.

Suspension of threads of the simulator (e.g., 310) in step 460 may also comprise aborting of the blocking function (e.g., implemented to block the hardware simulation thread in step 420). In one embodiment, aborting the blocking function may be performed by changing a value of a guard variable of a loop implementing the blocking function, signaling a semaphore implementing the blocking function, signaling a wait condition implementing the blocking function, signaling a condition variable implementing the blocking function, unlocking a mutex implementing the blocking function, or some combination thereof. Additionally, a TCP socket may be used as an IPC channel for aborting the blocking function in one embodiment. Further, additional user debug commands received while the threads of the simulator (e.g., 310) are suspended may be forwarded to the debugger (e.g., 120) by the simulated debugger UI (e.g., 337).

Step 470 involves executing the user debug command and any forwarded user debug commands. The debug commands may be executed by the debugger (e.g., 120). Thereafter, steps 420 through 470 may be repeated (e.g., as indicated by the dotted arrow). Alternatively, process 400 may conclude after step 470.

It should be appreciated that the execution of debug commands in step 470 may be interleaved with one or more steps of process 400. For example, if a debug command received in step 450 may be executed in step 470 before an additional debug command is forwarded. As such, the forwarded debug commands may be executed upon a future suspension of threads of the simulator (e.g., 310). Additionally, it should be appreciated that one or more steps of process 400 may be controlled or implemented by a state machine. The state machine may be implemented by a single thread (e.g., as discussed above with respect to FIG. 3) in one embodiment.

Figure 5:
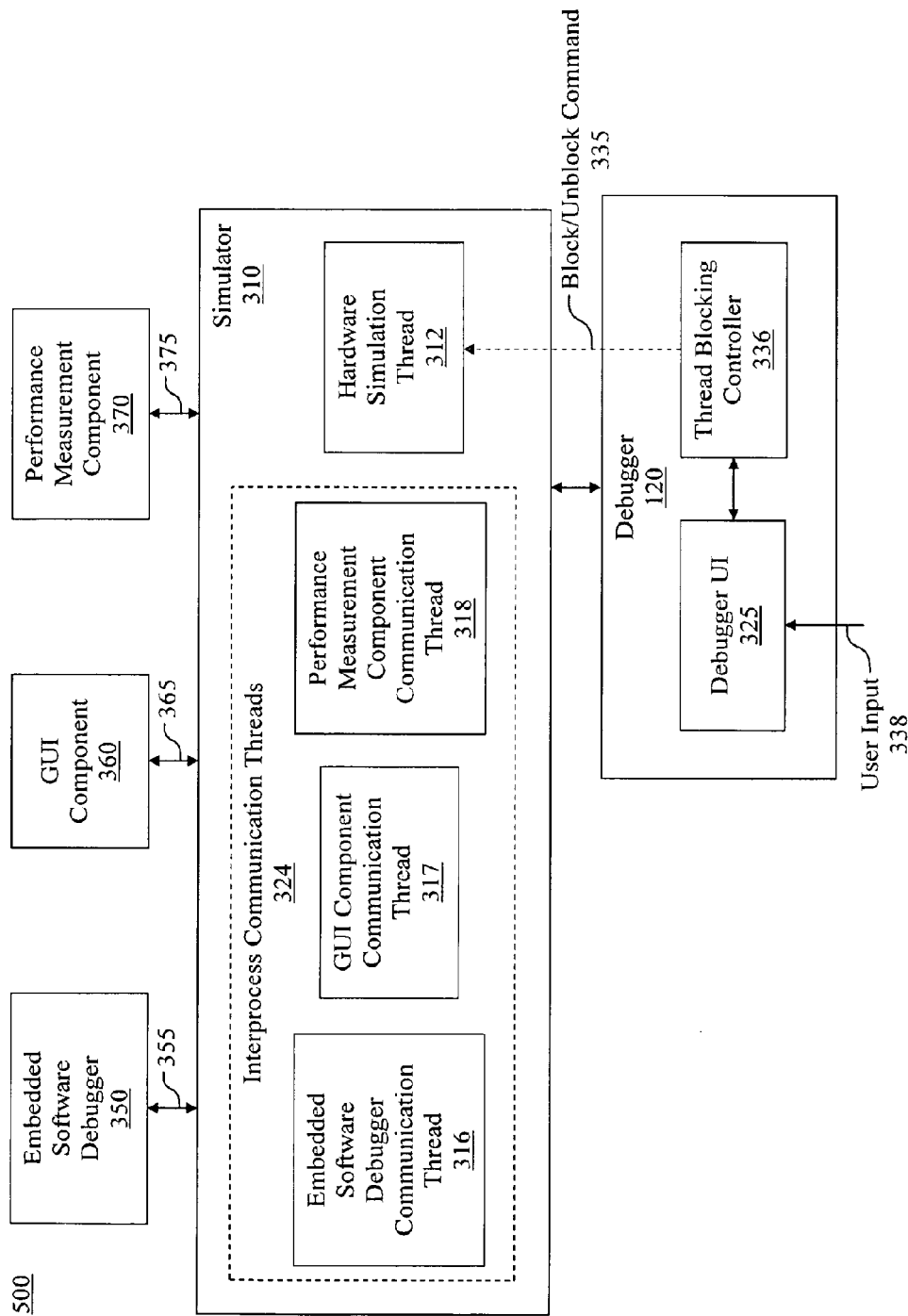
FIG. 5 shows an exemplary debugging system for implementing interprocess communication while a hardware simulation thread is blocked using a debugger with an internal thread blocking controller in accordance with one embodiment of the present invention.

FIG. 5 shows exemplary debugging system 500 for implementing interprocess communication while a hardware simulation thread is blocked using a debugger with an internal thread blocking controller in accordance with one embodiment of the present invention. As shown in FIG. 5, system 500 may operate similarly to system 300 of FIG. 3, except that thread blocking controller 336 is implemented within debugger 120 in system 500 as depicted in FIG. 5. As such, debugger UI 325 may interact with a user and accept user inputs 338 directly. Additionally, debugger UI 325 may interact with a user and accept user inputs 338 while hardware simulation thread 312 is blocked. Debugger UI 325 may also accept machine-input debugger commands from a device or system external to system 500, a component of system 500, etc.

Figure 6:
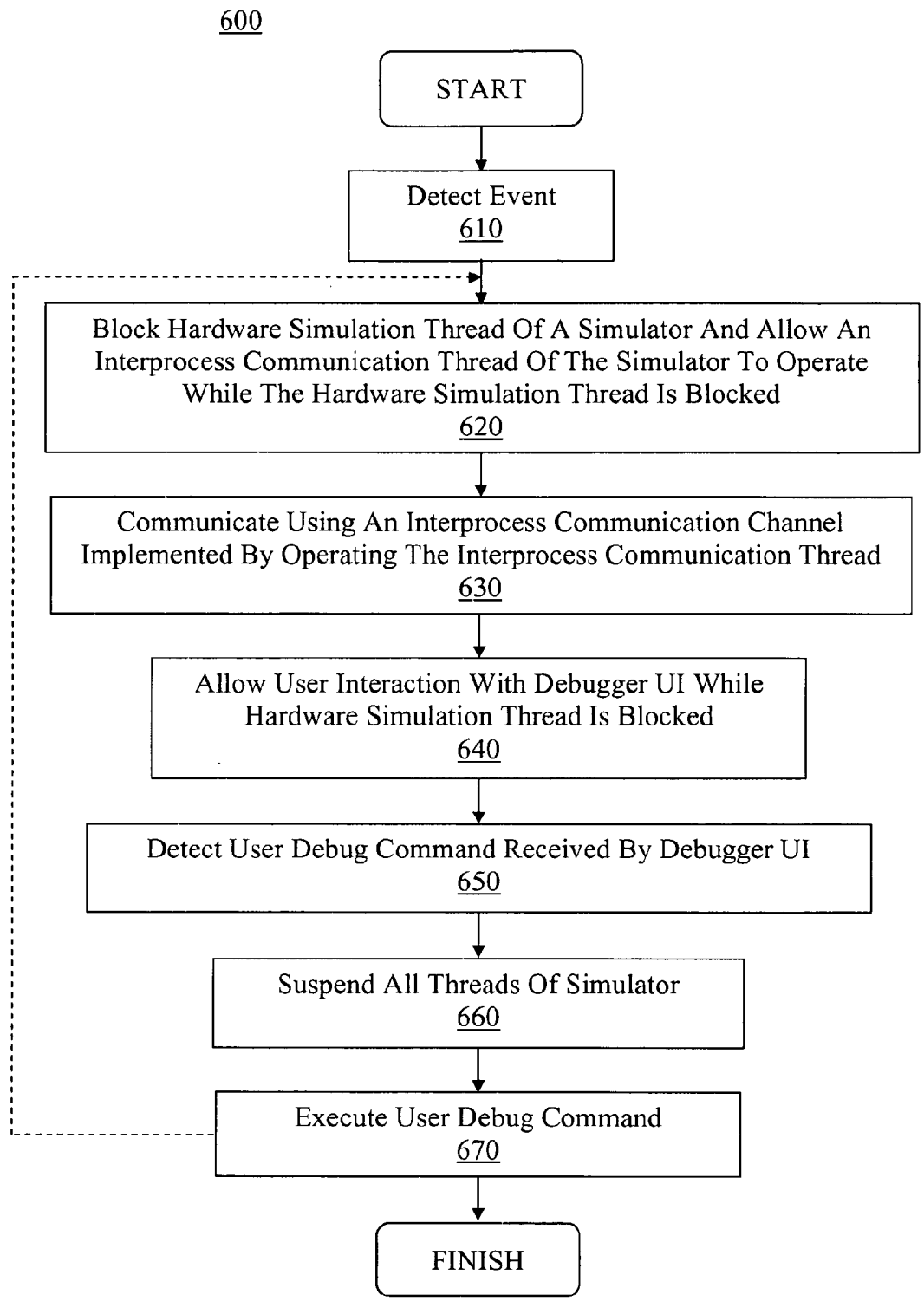
FIG. 6 shows an exemplary process for debugging a simulated component using a debugger with an internal thread blocking controller in accordance with one embodiment of the present invention.

FIG. 6 shows exemplary process 600 for debugging a simulated component using a debugger with an internal thread blocking controller in accordance with one embodiment of the present invention. As shown in FIG. 6, steps 610-630 may be performed analogously to steps 410-430 of FIG. 4 in one embodiment.

Step 640 involves allowing user interaction with a debugger UI (e.g., 325) while the hardware simulation thread (e.g., 312) is blocked. For example, user inputs (e.g., 338) may be accepted and the debugger UI may be updated in response to the user inputs in one embodiment.

As shown in FIG. 6, step 650 involves detecting a user debug command received by the debugger UI (e.g., 325). The user debug command may be detected by the debugger UI (e.g., 325) itself and/or a thread blocking controller (e.g., 336) coupled to the debugger UI (e.g., 325).

Step 660 involves suspending all threads of the simulator (e.g., 310) and may be performed analogously to step 460 of FIG. 4. Step 670 involves executing the user debug command. The debug commands may be executed by the debugger (e.g., 120). Thereafter, steps 620 through 670 may be repeated (e.g., as indicated by the dotted arrow). Alternatively, process 600 may conclude after step 670.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method for simulation debugging, comprising:
    detecting a breakpoint event of a simulator comprising a first thread that simulates hardware and a second thread;
    responsive to detecting the breakpoint event, transferring away control of the first thread of the simulator while allowing the second thread of the simulator to operate;
    blocking, by a debugger, the first thread of the simulator after the control of the first thread of the simulator is transferred away;
    accessing state of the simulator via the second thread of the simulator while the first thread of the simulator is blocked; and
    responsive to the debugger being unable to receive one or more user inputs via a debugger user interface (UI) while the first thread of the simulator is blocked:
        simulating, by a simulated debugger UI, the debugger UI while the first thread of the simulator is blocked by the debugger, wherein the simulated debugger UI receives the one or more user inputs.

2. The method of claim 1, further comprising:
    suspending the first thread and the second thread after accessing the state of the simulator via the second thread.

3. The method of claim 2, wherein suspending the first thread and the second thread after accessing the state of the simulator via the second thread comprises suspending the first thread and the second thread responsive to a user debug command.

4. The method of claim 3, further comprising:
    executing the user debug command while the first thread and the second thread are suspended.

5. The method of claim 1, wherein the first thread of the simulator is blocked by executing a blocking function in the first thread to block the first thread.

6. The method of claim 1, wherein accessing the state of the simulator via the second thread of the simulator comprises accessing the state of the simulator with an embedded software debugger.

7. The method of claim 1, wherein the first thread and the second thread are part of the same simulator process.

8. The method of claim 1, wherein the first thread corresponds to an interprocess communication channel.

9. A computer memory storing instructions for simulation debugging, the instructions when executed by a computer system cause the computer system to:
    detect a breakpoint event of a simulator comprising a first thread that simulates hardware and a second thread;
    responsive to detecting the breakpoint event, transfer away control of the first thread of the simulator while allowing the second thread of the simulator to operate;
    block, by a debugger, the first thread of the simulator after the control of the first thread of the simulator is transferred away;
    access state of the simulator via the second thread of the simulator while the first thread of the simulator is blocked; and
    responsive to the debugger being unable to receive one or more user inputs via a debugger user interface (UI) while the first thread of the simulator is blocked:
        simulate, by a simulated debugger UI, the debugger UI while the first thread of the simulator is blocked by the debugger, wherein the simulated debugger UI receives the one or more user inputs.

10. The computer memory of claim 9, the instructions further causing the computer system to:
    suspend the first thread and the second thread after accessing the state of the simulator via the second thread.

11. The computer memory of claim 10, wherein the computer system suspends the first thread and the second thread after accessing the state of the simulator via the second thread by suspending the first thread and the second thread responsive to a user debug command.

12. The computer memory of claim 11, the instructions further causing the computer system to:
    execute the user debug command while the first thread and the second thread are suspended.

13. The computer memory of claim 9, wherein the first thread of the simulator is blocked by executing a blocking function in the first thread to block the first thread.

14. The computer memory of claim 9, wherein the computer system accesses the state of the simulator via the second thread of the simulator by accessing the state of the simulator with an embedded software debugger.

15. The computer memory of claim 9, wherein the first thread and the second thread are part of the same simulator process.

16. The computer memory of claim 9, wherein the first thread corresponds to an interprocess communication channel.

* * * * *